United States Patent Office 3,004,941
Patented Oct. 17, 1961

3,004,941
HEAT RESISTANT LIQUID RESIN COMPOSITION FROM PHENOL, FORMALDEHYDE AND DICYANDIAMIDE, AND PROCESS FOR MAKING SAME
Jerome J. Mestdagh, Springfield, and Charles A. Magarian, Hampden, Mass., assignors to Monsanto Chemical Company, St. Louis, Mo., a corporation of Delaware
No Drawing. Filed Mar. 17, 1958, Ser. No. 721,693
7 Claims. (Cl. 260—29.3)

The present invention is directed to providing fusible water-dilutable liquid resin compositions which are heat resistant when cured and more particularly to resin compositions comprising mixtures of dicyandiamide-formaldehyde and phenol-formaldehyde partial condensates.

Phenol-formaldehyde liquid resins are widely used as binders in various applications. In practice, these resins are initially applied in liquid form to the materials which are to be adhered or cohered, as for example glass fibers, and then subjected to thermosetting conditions to convert the mass to solid form. A distinct disadvantage has accomplished use of these resins in certain technical areas resulting from their comparatively low heat resistance and flame retardance. Various attempts have been made to remedy this situation but with little success. In general, the attempts can be described as directed to introducing or incorporating nitrogeneous components such as cyanamides, having the desired thermal qualities into the resins. One such process which is directed to incorporating nitrogeneous material into these resins prescribes reacting an aliphatic aldehyde with phenol under alkaline catalytic conditions to form a partial condensation product which is in turn interreacted with a cyandiamide such as dicyandiamide, melamine or the like. These expedients, however, in turn give rise to further problems. More particularly, while the introduction of these materials does enhance the qualities of fire resistance and flame retardance of the cured material in attaining this end, the water-dilutability properties otherwise present and which facilitate their initial application, are sacrificed. In addition, this loss is magnified if the resins, so treated, are allowed to stand for any period prior to application. As a result, and for the most part, the introduction of the nitrogeneous material is carried out immediately prior to application. It has now been discovered that single package water-dilutable resins can be provided through exercise of a peculiar process.

Accordingly, it is a principal object of the present invention to provide water-dilutable liquid resins which are heat resistant and flame retardant when cured.

Another object is to provide such resins containing phenol-formaldehyde thermosetting resins.

Other objects of the invention will in part be obvious and will in part appear hereinafter.

These and other objects can be attained by reacting dicyandiamide and formaldehyde in the presence of a fusible alkaline catalyzed phenol-formaldehyde water-dilutable reaction mixture to form in admixture with said reaction mixture a water-dilutable liquid partial condensate of dicyandiamide and formaldehyde.

The following examples are given in illustration of the invention. Where parts are mentioned, parts by weight are intended unless othrewise prescribed.

*Example I*

To a reaction vessel fitted with an agitator, a heater and a condenser adapted for refluxing under vacuum conditions, add 100 parts of phenol, 340 parts of 37% formalin and 3.7 parts of sodium hydroxide to provide a pH of 8.5–9.0. The mixture is allowed to react by providing a temperature of about 70° C. Reaction is continued until the free formaldehyde in the reaction mixture drops to a predetermined content of approximately 12.2% by weight of the reaction mixture as determined by the hydroxylamine hydrochloride test. The product is then cooled to 40–50° C. and the pH adjusted to 7.5–8.0 by the addition of 10% hydrochloric acid. The reaction mixture at this point is considered to be infinitely water-dilutable; i.e., 24 or more volumes of water may be mixed with 1 volume of the reaction mixture at a temperature of 24–26° C. without causing the mixture to exhibit haziness or milkness. Sixty-five parts of dicyandiamide are then added and the mixture is heated to 60–70° C. When the dicyandiamide becomes dissolved or about the time the reaction mixture reaches 60–70° C., the reaction is arrested by cooling to 20–30° C. The product can be diluted in 24 volumes of water without exhibiting cloudiness and accordingly is considered to be infinitely water-dilutable. When tested it is found to contain in mol ratio approximately 2.2 mols of formaldehyde reacted with each mol of phenol and 1.6 mols of formaldehyde reacted with each mol of dicyandiamide using the hydroxylamine hydrochloride test for residual free formaldehyde. The test is run before and after the addition of the dicyandiamide.

The diluted product is allowed to stand for a period of 24 hours and no haziness or milkiness is observed. Another portion of the above product is retained for a period of several weeks at a temperature of 0–10° C. and when tested for dilutability exhibits substantially the same standard as above.

Another portion of the above product is diluted in water to about 18% solids. This solution is sprayed onto a matrix of glass fibers in an amount equal to about 8% by weight of cured resin. The assembly is subjected to drying conditions by forcing a volume of air heated at 100° F. through the same for a period of 3 minutes. The dried assembly is placed in a mold and cured for 2 minutes at 400° F. to form semi-cylindrical sections of 2-inch thickness, 3 feet in length and having an interior diameter of 2 inches. The sections are applied to the exterior of a 2-inch diameter iron pipe and wound with asbestos-treated canvas and clamped. When the pipe is subjected to interior temperatures up to 600° F., the material does not exhibit punking or lose its insulation properties.

When commercially available phenol-formaldehyde resins are utilized in accordance with the preceding, punking and degradation of the insulating qualities are manifest when subjected to temperatures in excess of 300° F.

*Example II*

To the reaction vessel of Example I, add 100 parts of phenol, 280 parts of 37% formalin, and 3.7 parts of sodium hydroxide. The reaction is carried out as above until the free formaldehyde drops to approximately 8.8% by weight of the reaction mixture. After cooling and adjusting the pH as disclosed above, 40 parts of dicyandiamide are added and the reaction continued until the dicyandiamide is in solution. The product contains in mol ratio approximately 2.2 mols of formaldehyde reacted with each mol of phenol and 1.4 mols of formaldehyde reacted with each mol of dicyandiamide and is dilutable with 24 volumes of water.

*Example III*

The procedure set forth in Example I is again followed with the exception that pH of the reaction mixture is adjusted from 8.5–9.0 to 7.5–8.0 with 10% hydrochloric acid after the addition and reaction of the dicyandiamide with formaldehyde. The product which results can be diluted in 24 volumes of water without exhibiting hazing, etc.

*Example IV*

The procedure set forth in Example I is again followed with the exception that after addition of the dicyandiamide the mixture is reacted at 70° C. for 30 minutes. The water dilutability of this product is about 10 to 1, which is considered about the minimum required for a highly water-dilutable resin.

*Example V*

The reaction vessel is again charged with 100 parts of phenol, 340 parts of 37% formalin and 3.7 parts of sodium hydroxide. The mixture is allowed to react by providing a temperature of about 70° C. Reaction is continued until the free formaldehyde in the reaction mixture approaches a predetermined content of approximately 12.2% by weight of the reaction mixture as determined by the hydroxylamine hydrochloride test. The product is then cooled to 40–50° C. and the pH adjusted to 7.5–8.0 by the addition of 10% hydrochloric acid. The reaction mixture at this point is infinitely water-dilutable; a one volume portion thereof can be diluted with 24 volumes of water without haziness or milkiness being exhibited. Sixty-five parts of dicyandiamide are then added to the mixture and the whole is allowed to reflux at atmospheric conditions or about 100° C., for a period of 30 minutes, followed by cooling to 20–30° C. A portion of the resulting product is mixed with a one-half volume of water accompanied by stirring. Upon termination of stirring milkiness is exhibited indicating that the product has less than 0.5 water-dilutability. Another portion of the product is allowed to stand for a period of 12 hours and when then observed is found to have separated into two phases, a water phase floating on a resinous phase, the latter is determined as being a copolymer of phenol-formaldehyde-dicyandiamide.

The foregoing indicates that the phenol-formaldehyde condensate will interreact with the dicyandiamide to form a non-dilutable copolymer unless a critical time-temperature relationship is followed particularly after introduction of the dicyandiamide to the reaction medium.

The process of the present invention is directed to providing water-dilutable, fusible liquid resin compositions which when cured are heat-resistant, punk-resistant and flame retardant. It involves reacting dicyandiamide and formaldehyde in the presence of an alkaline catalyzed reaction mixture of phenol-formaldehyde to produce a water-dilutable fusible admixture of condensates of phenol-formaldehyde and dicyandiamide-formaldehyde. The process can be initiated by reacting a first charge of phenol with formaldehyde in mol ratio equal to 1.0 mol of phenol to .8–3.0 mols of formaldehyde preferably the ratio is 1.0 to 1.5–2.5 respectively, under alkaline catalyzed conditions to provide a reaction mixture which is a water-dilutable condensate of phenol-formaldehyde having the above proportions as constituents. A second charge of formaldehyde is provided preferably at initiation of the phenol-formaldehyde reaction but can be added at any point in time thereafter and preferably prior to or immediately after addition of the dicyandiamide which latter must be added after initiation of the phenol-formaldehyde reaction. The amount of formaldehyde in the second charge considered with relation to the dicyandiamide is .5–2.0 mols of formaldehyde to 1.0 mol of dicyandiamide, with 1.2–1.6 mols of formaldehyde per mol of dicyandiamide having been found the more attractive. Generally, it is desirable to add the dicyandiamide at or near the end of phenol-formaldehyde reaction to minimize the formation of inter-condensates of phenol-formaldehyde-dicyandiamide reaction products, which are not dilutable with water.

The reaction temperatures prescribed for reacting the phenol-formaldehyde to form a water-dilutable partial condensate thereof range between 40–100° C. with the further preference of 60–80° C. Alkaline catalyzed conditions are also prescribed with the preference such that the pH lies between 8.0–10.0. The catalysts which can be used include sodium hydroxide, calcium hydroxide, potassium hydroxide, etc.

The second stage reaction, that of the formaldehyde and dicyandiamide can be carried out under temperature conditions set forth above; however, the pH conditions are more liberal allowing a range of 5.0–10.0 to be exercised with, however, the further preference directed to 7.0–9.0.

In a preferred embodiment the process is initiated with phenol and both charges of formaldehyde present. The reaction is carried out until a predetermined formaldehyde content remains as determined by the hydroxylamine hydrochloride test. At this point, the mixture is cooled to 30–50° C. and the dicyandiamide added, followed by subjection to reaction temperature to allow reaction of the formaldehyde and dicyandiamide to form a water-dilutable condensate thereof in situ with a water-dilutable condensate of phenol-formaldehyde. The temperature, time and desired magnitude of water-dilutability of the product are interrelated. Higher temperatures and longer periods of time of reaction will diminish water-dilutability by causing the formation of a copolymer of the three constituents, formaldehyde, phenol and dicyandiamide, or possibly of high molecular weight phenol-formaldehyde and dicyandiamide-formaldehyde cocondensate reaction products. At the other extreme reaction between the formaldehyde and the dicyandiamide must be facilitated. Accordingly, the particular occasion will dictate the magnitude of water-dilutability desirable in the admixed product and this in turn will determine the time-temperature relationship to be exercised, limited however to the temperature ranges set forth above. The time for reaction of the second stage or dicyandiamide-formaldehyde can be determined by use of the water-dilutability test as previously described in Example I and used with reference to the first stage or phenol-formaldehyde reaction.

When the reaction has been carried out to the point where desirable reaction product of dicyandiamide-formaldehyde is obtained, the temperature of the reaction mixture and correspondingly the resultant partial condensate is lowered to arrest further reaction or condensation. The temperature need only be lowered an effective amount, in this respect desirable results have been obtained by lowering the temperatures to 20–30° C. or room temperature.

Various catalysts can also be used in the second stage, such as sodium, calcium, potassium, barium and lithium hydroxides, etc., which can be neutralized by addition of sulfuric, boric, phosphoric and other acids can be utilized.

The amount of phenol-formaldehyde reaction product which is obtained admixed with the dicyandiamide-formaldehyde condensate in the final product can be varied by varying the initial charges of each. Variations in amounts also can be obtained by further additions and blendings carried out after either or both reactions are completed. The resulting admixed resin products are stable and can be handled like ordinary phenolic liquid resins. The amount of dicyandiamide-formaldehyde partial condensate in the resulting liquid resin product can range up to 50% by weight of solids. The higher content of dicyandiamide-formaldehyde partial condensate present will contribute greater heat-resistant, punk-resistant and flame-retardant properties to the product. Proportions of greater than 30% will suffer from poorer stability.

The resins which result from exercise of the present invention can be shipped and stored as a single package for later use as binders in applications requiring punk-resistance, heat resistance or flame retardance properties. No modification in equipment as to utilization is required. The resins can be used as binders in applications involving glass fibers, rock wool, cellulosic products, etc., which find utility as filters, battery separators, electrical and thermal insulation and the like. The binders can be used in laminates, surface coatings, impregnants, adhesives, bindings and the like.

It will thus be seen that the objects set forth above, among those made apparent from the preceding description, are efficiently attained and, since certain changes may be made in carrying out the above process or method without departing from the scope of the invention, it is intended that all matter contained in the above description shall be interpreted as illustrative and not in a limiting sense.

What is claimed is:

1. A process for producing water-dilutable fusible liquid resin compositions comprising a mixture of dicyandamide-formaldehyde partial condensates and phenol-formaldehyde reaction products which comprises reacting in mol ratio 0.5–2.0 mols of formaldehyde and 1.0 mol of dicyandiamide in the presence of alkaline catalyzed fusible reaction products of phenol-formaldehyde being in mol ratio of 1.0 mol of phenol to 0.8–3.0 mols of formaldehyde at a pH of between 5–10 and a temperature of 40–100° C. until a water-dilutable liquid partial condensate of dicyandiamide and formaldehyde is formed.

2. A process for producing water-dilutable fusible liquid resin compositions comprising a mixture of dicyandiamide-formaldehyde partial condensates and alkaline catalyzed phenol-formaldehyde reaction products which comprises reacting in mol ratio 0.5–2.0 mols of formaldehyde and 1.0 mol of dicyandiamide in the presence of said reaction products at a pH of between 7.0–9.0 and a temperature of 60–80° C. until a water-dilutable liquid partial condensate of dicyandiamide and formaldehyde is formed, said reaction product being in mol ratio of 1.0 mol of phenol to 0.8–3.0 mols of formaldehyde.

3. The process according to claim 2 wherein the partial condensate contains in mol ratio 1.2–1.6 mols of formaldehyde per 1.0 mol of dicyandiamide.

4. A process for producing water-dilutable fusible liquid resin compositions comprising a mixture of dicyandiamide-formaldehyde partial condensate and alkaline catalyzed phenol-formaldehyde reaction products which comprises reacting in mol ratio of 1.2–1.6 mols of formaldehyde and 1.0 mol of dicyandiamide in the presence of said reaction products at a pH of 7.0–9.0 and a temperature of 60–80° C. until a partial condensate of dicyandiamide and formaldehyde is formed, said reaction products being in mol ratio of 1.0 mol of phenol to 1.5–2.5 mols of formaldehyde.

5. An aqueous-solvated, liquid, water-dilutable, fusible dicyandiamide-formaldehyde resin composition in single package form adapted for shipping and storing thereof and exhibiting improved water-dilutability retention, the said composition comprising an aqueous-solvated, liquid, water-dilutable, fusible mixture of condensates of dicyandiamide-formaldehyde and phenol-formaldehyde of the type resulting from reacting 1.0 mol of dicyandiamide and 0.5–2.0 mols of formaldehyde in mol ratio in the presence of an alkaline-catalyzed water-dilutable reaction mixture of phenol-formaldehyde at a pH of 5.0–10.0 and a temperature of 40°–100° C. until a water-dilutable, liquid partial condensate of dicyandiamide and formaldehyde is formed as determined by the said partial condensate phobing in a quantity of water, the said phenol-formaldehyde reaction mixture being constituted of 1.0 mol of phenol to 0.8–3.0 mols of formaldehyde in mol ratio.

6. A method for preparing a resin composition having improved stability so as to render it suitable for shipping and storing which resin composition comprises aqueous-solvated, liquid, water-dilutable, fusible dicyandiamide-formaldehyde resin condensates exhibiting improved water-dilutability retention which method comprises providing the said condensate in the form of an aqueous-solvated, liquid, water-dilutable, fusible mixture of condensates of dicyandiamide-formaldehyde and phenol-formaldehyde of the type resulting from reacting 1.0 mol of dicyandiamide and 0.5–2.0 mols of formaldehyde in mol ratio in the presence of an alkaline-catalyzed, water-dilutable reaction mixture of phenol-formaldehyde at a pH of 5.0–10.0 and a temperature of 40°–100° C. until a water-dilutable, liquid, partial condensate of dicyandiamide and formaldehyde is formed as determined by the said partial condensate phobing in a quantity of water, the said phenol-formaldehyde reaction mixture being constituted of 1.0 mol of phenol to 0.8–3.0 mols of formaldehyde in mol ratio.

7. A heat-resistant, punk resistant and flame retardant thermoset product obtained by curing an aqueous-solvated, liquid, water-dilutable, fusible dicyandiamide-formaldehyde resin composition in single package form adapted for shipping and storing thereof and exhibiting improved water-dilutability retention, the said composition comprising an aqueous-solvated, liquid, water-dilutable, fusible mixture of condensates of dicyandiamide-formaldehyde and phenol-formaldehyde of the type resulting from reacting 1.0 mol of dicyandiamide and 0.5–2.0 mols of formaldehyde in mol ratio in the presence of an alkaline-catalyzed water-dilutable reacton mixture of phenol-formaldehyde at a pH of 5.0–10.0 and a temperature of 40°–100° C. until a water-dilutable, liquid, partial condensate of dicyandiamide and formaldehyde is formed as determined by the said partial condensate phobing in a quantity of water, the said phenol-formaldehyde reaction mixture being constituted of 1.0 mol of phenol to 0.8–3.0 mols of formaldehyde in mol ratio.

References Cited in the file of this patent

UNITED STATES PATENTS

| | | |
|---|---|---|
| 2,604,427 | Armstrong et al. | July 22, 1952 |
| 2,737,504 | Dawson et al. | Mar. 6, 1956 |

FOREIGN PATENTS

| | | |
|---|---|---|
| 498,165 | Great Britain | Jan. 4, 1939 |
| 59,027 | Russia | Feb. 28, 1941 |

OTHER REFERENCES

Serial No. 237,057, publication of Greth (A.P.C.), published April 20, 1943, now abandoned.